United States Patent
Corey, Jr.

(10) Patent No.: US 7,136,376 B2
(45) Date of Patent: Nov. 14, 2006

(54) PUBLIC SWITCHED BROADBAND NETWORK

(75) Inventor: Charles D. Corey, Jr., Herndon, VA (US)

(73) Assignee: VisuTel, Inc., Virginia Beach, VA (US)

( * ) Notice: Subject to any disclaimer, the term of this patent is extended or adjusted under 35 U.S.C. 154(b) by 844 days.

(21) Appl. No.: 10/081,912

(22) Filed: Feb. 22, 2002

(65) Prior Publication Data

US 2003/0161329 A1 Aug. 28, 2003

(51) Int. Cl.
*H04L 12/56* (2006.01)

(52) U.S. Cl. .................. 370/353; 370/466; 379/88.17; 709/230

(58) Field of Classification Search ........ 370/352–356, 370/400, 401, 466, 467, 486, 487, 394, 469; 725/105; 348/12; 375/220–272; 711/140; 379/88.17; 709/230
See application file for complete search history.

(56) References Cited

U.S. PATENT DOCUMENTS

| | | | |
|---|---|---|---|
| 5,537,142 A | 7/1996 | Fenouil | 725/105 |
| 5,970,473 A * | 10/1999 | Gerszberg et al. | 705/26 |
| 6,240,554 B1 | 5/2001 | Fenouil | 725/105 |
| 6,909,717 B1 * | 6/2005 | Higgins | 370/394 |
| 2002/0054629 A1 * | 5/2002 | Roos | 375/222 |
| 2002/0129206 A1 * | 9/2002 | Khare et al. | 711/140 |

OTHER PUBLICATIONS

"ADSL Tutorial"; DSL Forum. 2001; Internet; pp. 1-3.
"Fast Guide to DSL"; Search Networking.com; Internet; pp. 1-7; Dec. 2001.

* cited by examiner

*Primary Examiner*—John Pezzlo
(74) *Attorney, Agent, or Firm*—Rossi, Kimms & McDowell, LLP

(57) ABSTRACT

A Public Switched Broadband Network (PSBN) and method of operation permits high-speed, broadband, simultaneous, bi-directional data transfer over the infrastructure of conventional public switched telephone network. In addition, the PSBN provides a high-speed broadband public switched network that utilizes a common data transmission protocol from a broadband or internet service provider, through inter-office facilities, through a serving central office and to the end user, thereby providing a substantially "flat" network and reducing latency problems associated with protocol conversions. Still further, the PSBN provides expanded capacity throughout the network without requiring the implementation of new infrastructure.

19 Claims, 4 Drawing Sheets

PUBLIC SWITCHED BROADBAND NETWORK

FIELD OF THE INVENTION

The invention relates in general to a public switched broadband network. More specifically, the invention is directed to a public switched broadband network and method of operation that permits high-speed, broadband, simultaneous, bi-directional data transfer over the infrastructure of conventional public switched networks.

BACKGROUND OF THE INVENTION

The development of the Internet has led to an increasing demand for high-speed broadband access. In the case of larger commercial and government organizations, the requirement for high-speed broadband access has been obtained through the use of various technologies including private lines (for example T1 lines), private networks and satellite links. These types of technologies, however, are neither economically nor technically feasible for residential homes and small businesses.

A large unfulfilled demand remains for a high-speed broadband internet access in the area of residential homes and small business. This segment of the commercial market also has the greatest potential for growth in the future, and the development of this market is also critical to the development of electronic commerce. The ultimate success of many potential commercial Internet applications including, for example, on demand movies, video conferencing, real-time online gaming, online shopping, etc. depends on the expansion of high-speed broadband access on a large scale into the average residential home and small business.

While new technologies have been developed that would permit the extension of broadband capability into the residential home and small business environment, they are limited in practical application. Cable television companies, for example, have recently introduced cable modem technology that permits broadband access using coaxial cable lines. Many communities, however, still lack basic cable service let alone broadband cable access. High speed broadband access via a satellite link is also now possible for residential homes and small business, but such systems generally only provide broadband capability on the downlink side. In other words, downlink from the satellite to the end user is a broadband connection, but the uplink from the end user to the internet service provider is usually provided over conventional telephone lines using conventional modems. The inability for such systems to provide bi-directional broadband makes them useless for applications such as real-time video conferencing.

The one network that is already coupled to almost every home and small business is the Public Switched Telephone Network (PSTN). The PSTN, however, was originally developed using copper technology that was never intended to provide the broadband capability now in demand. Traditional plain old telephone service (sometimes referred to as POTS) connects to a home or small business using a twisted pair of copper wires originally designed to carry voice information in the form of an analog signal. In order to enable digital data transfer between computers over the POTS, a modem has conventionally be used at the transmission end to convert digital data from the transmitting computer to an analog signal that can be switched over the POTS, and at the receiving end converts the analog signal back into digital data. Data transmission rates with conventional dial-up modems, however, are limited to about 56 Kbps (thousands of bits per second).

Accordingly, attempts have been made to provide technology that can upgrade and expand the capability of the conventional PSTN to increase data transfer rates above those possible with conventional dial-up modem services. One technology that has been developed to provide broadband capability to homes and small businesses is Digital Subscriber Line (DSL). In fact, there are a number of different versions of DSL, and the designation "xDSL" is sometimes utilized to generalize the different versions of DSL such as ADSL, HDSL and RADSL. Regardless of the specific version, DSL basically depends upon advanced digital signal processing methods to transfer as much data as possible through a conventional twisted copper pair of the PSTN. Downstream data transfer rates as high as 8 Mbps (megabits per second) are possible with some versions of DSL.

While DSL is a great improvement over conventional dial-up modems, the technology has a number of limitations. One of the more significant limitations is the maximum transmission range of DSL. Depending on the gauge of wire used, the end user must be located no more than just 5.5 km (using 24 gauge wire) from a central office of the telephone company. Further, in practice, line attenuation increases with line length. Thus, utilization of the maximum range of 5.5 km causes a corresponding drop in data transfer rates to just around 1.5–2.0 Mbps. While it may be possible to extend the range of DSL, such an extension would require a large capital investment to install optical fiber communication lines between the central office of the PSTN and DSL subscribers. Accordingly, a wholesale reconstruction of the PSTN would be required.

Moreover, the DSL architecture does nothing to improve the overall capacity of the PSTN. In a DSL system, data received from an end user is separated in a serving central office of the PSTN into conventional voice data and multimedia data. The conventional voice data is transmitted through the PSTN using synchronous transmission in a conventional manner. The multimedia data is transmitted over a separate line from the conventional voice data also through the use of a synchronous transmission protocol. The DSL architecture does nothing to increase the bandwidth capability of the existing copper or optical transmission lines. Accordingly, the implementation of DSL causes a corresponding drop in the number of conventional voice communications that can be handled by the PSTN.

Still further, the DSL architecture requires a number of different data transfer protocols to be utilized. For example, a computer at a user's location is normally connected to a DSL modem. Communication between the modem and the computer is normally accomplished using a Local Area Network (LAN) protocol such as Ethernet. A DSL protocol is then utilized to communication between the DSL modem and the serving central office of the PSTN. A separate synchronous transmission protocol is then utilized within the PSTN for data transfer. Finally, a further optical transmission protocol is utilized if optical transmission lines are provided within the PSTN. Accordingly, the resulting architecture requires a large number of protocol layers resulting in latency in the network and complexity in the overall system.

As will be readily appreciated from the disadvantages described above, it would be desirable to provide a high-speed broadband capability between the PSTN and an end user over a conventional copper twisted pair without the range limitations of DSL.

It would also be desirable to provide a high-speed broadband public switched network that utilized a single protocol from a broadband service provider, through the inter-office facilities, through the serving central office and to the end user, thereby providing a substantially "flat" network and reducing latency problems associated with protocol conversions.

Still further, it would also be desirable to provide the above features while expanding the capacity of the PSTN without requiring a change in infrastructure, thereby allowing a public switched broadband network to be implemented using conventional copper and optical fiber transmission lines.

SUMMARY OF THE INVENTION

The invention provides a Public Switched Broadband Network (PSBN) and method of operation that permits high-speed, broadband, simultaneous, bi-directional data transfer over the infrastructure of conventional public switched telephone network. In addition, the PSBN provides a high-speed broadband public switched network that utilizes a common data transmission protocol from a broadband service provider, through inter-office facilities, through a serving central office and to the end user, thereby providing a substantially "flat" network and reducing latency problems associated with protocol conversions. Still further, the PSBN provides expanded capacity throughout the network without requiring the implementation of new fiber infrastructure, by utilizing BSL technology disclosed and described in U.S. Pat. No. 5,537,142 and U.S. Pat. No. 6,240,554.

Specifically, a PSBN is provided that includes at least one serving central office having a switching device, at least one end user unit that includes a data communication device coupled to the switching device of the serving central office via at least one twisted pair line, and an internet appliance device that is coupled to the data communication device. Multimedia data is transferred between the switching device of the serving central office and the data communication device of the end user unit, and between the data communication device of the end user unit and the internet appliance device of the end user unit using a common data transmission protocol.

The PSBN preferably also includes at least one inter-office facility coupled to the serving central office via a first data transmission line, wherein the multimedia data is transferred between the inter-office facility and the serving central office over the first data transmission line using the common data transmission protocol.

Still further, at least one internet service provider is preferably coupled to the inter-office facility via a second data transmission line, wherein the multimedia data is transferred between the internet service provider and the inter-office facility over the second data transmission line using the common data transmission protocol.

The first transmission line and the second transmission line may comprise an optical fiber transmission line or a copper transmission line.

In the event that a optical transmission line cannot be provided without the use of a conventional optical data transmission protocol, a further embodiment is provided in which at least one inter-office facility is coupled to the serving central office via a first data transmission line, and at least one internet service provider is coupled to the inter-office facility via a second data transmission line, wherein at least one of the first data transmission line and the second data transmission line comprise an optical fiber transmission line, and wherein the multimedia data is transmitted over the optical fiber transmission line utilizing an optical data transmission protocol that is different from the common data transmission protocol. Although this embodiment requires the use of two protocols, it is still a substantial improvement over the conventional DSL architecture which may require up to four levels of protocol.

The PSBN is preferably implemented using BSL technology, which allows a data transmission rate between the serving central office and the end user unit of at least 10 Mbps symmetrically on at a single twisted pair line.

In addition, the BSL technology overcomes attenuation problems associated with DSL technology, which allows the distance from the central serving office to the end user unit to be at least 8500 ft. These speeds can be maintained at up to 3 times the distances using line-powered repeaters The common data transmission protocol is preferably an asynchronous protocol, which further simplifies data transmission through the PSBN.

In operation, multimedia data is generated using an internet appliance at an end user unit. The multimedia data is transferred from the internet appliance to a data communication device of the end user unit using a common data transmission protocol. Using the same common data transmission protocol, the multimedia data is transferred from the data communication device of the end user unit to a serving central office of a public switched telephone network via a twisted pair line. From there, the multimedia data is transferred from the serving central office to at least one inter-office facility over a communication line using the common data transmission protocol. The multimedia data is then transferred from the inter-office facility over a further communication line, again using the common data transmission protocol, to at least one broadband or internet service provider. Data transfer from the broadband or internet service provider to the internet appliance occurs in the reverse order.

BRIEF DESCRIPTION OF THE DRAWINGS

The invention will be described in greater detail with reference to certain preferred embodiments and the accompanying drawings, wherein.

DETAILED DESCRIPTION OF THE PREFERRED EMBODIMENTS

Prior to discussing the preferred embodiments of the invention, a brief description of conventional technologies will be reviewed in order to provide a basis for understanding the improvements associated with the present invention.

Figure 1:
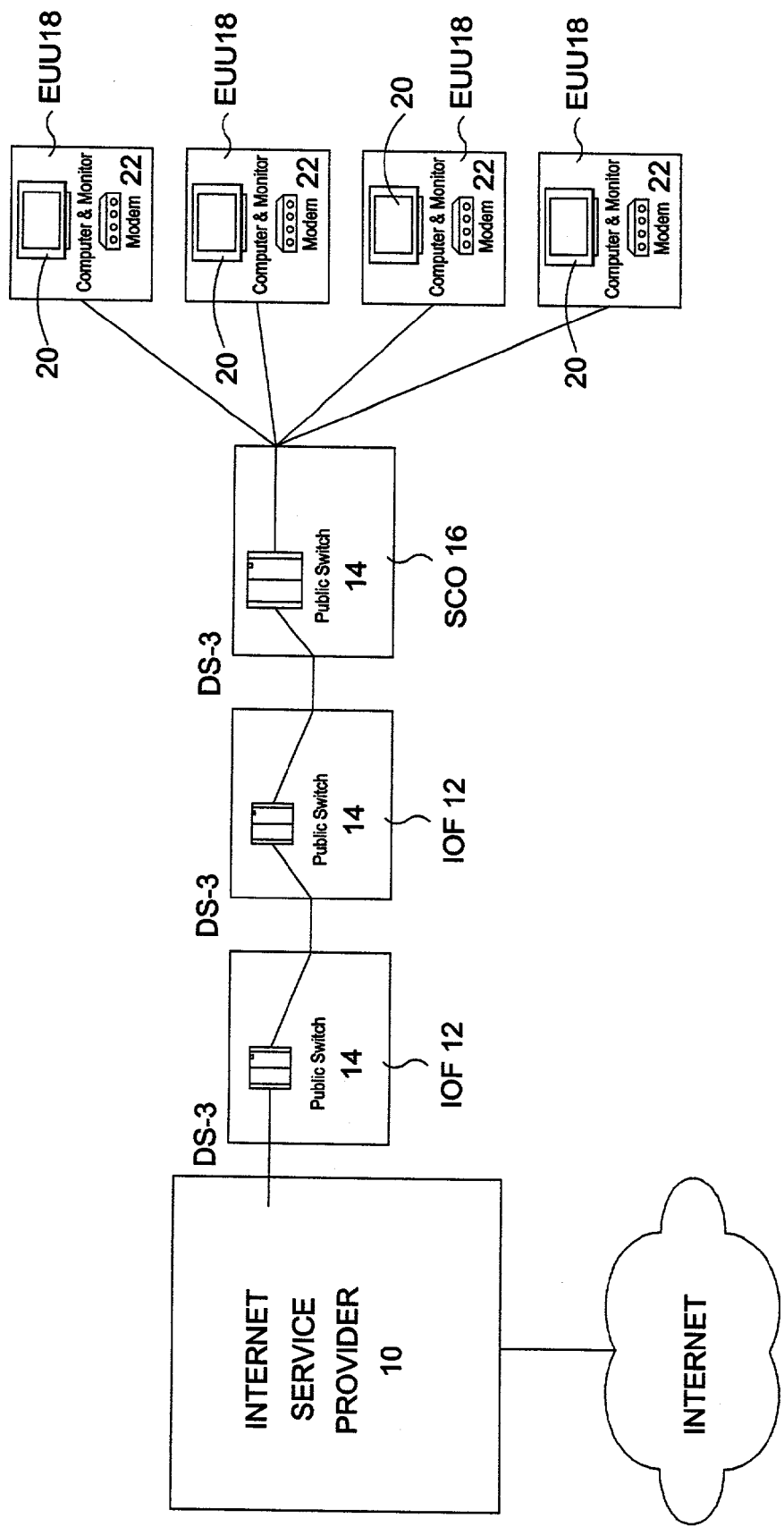
FIG. 1 is a block diagram of a conventional public switched network utilizing copper and/or optical fiber communication lines.

An example of a conventional copper based PSTN is illustrated in FIG. 1. As shown in the illustrated example, an Internet Service Provider (ISP) 10 is coupled to one of a plurality of Inter-Office Facilities (IOF's) 12. Each of the IOF's 12 is provided with a conventional public Time Division Multiplexing (TDM) voice switch 14. Data from the ISP 10 is routed through the IOF's 12 to a Serving Central Office (SCO) 16 by operation of the public switches 14. The SCO 16 is ultimately connected to a plurality of End User Units (EUU) 18.

The connection between the ISP 10 and the IOF 12 and between the IOF 12 and the SCO 16 are provided by conventional copper Digital Signal Level 3 (DS-3) lines. A single DS-3 line is equivalent to 28 T1 or DS-1 lines and operates at a total signaling rate of 44,736 Mbps. When divided into channels for voice applications, 673 channels can be supported with each encoded at 64 Kbps. Synchronous transmission of data is utilized through the network using an established synchronous protocol known as TDM over SONET.

The connections between the SCO 16 and the EUU's 18 are provided over a copper twisted pair line. Absent the use of enhancement technologies such as DSL discussed above, data transmission over the copper twisted pair is limited in the conventional PSTN of up to 56 Kbps between the SCO 16 and the EUU's 18.

Recent efforts to upgrade the capacity of the PSTN have led to the use of optical fiber communication lines in place of the copper DS-3 lines. The data transmission rate for an Optical Carrier Level 1 (OC-1) line is 51.840 Mbps. OC-1 provides for the direct electrical-to-optical mapping of the DS-3 electrical signal. Higher levels are provided as multiples of OC-1. For example, OC-3 equals three times OC-1, which is 155.52 Mbps, while OC-256 has a digital bit rate of 13.271 Gpbs. OC-256 can accommodate 172,032 voice circuits, which is equal to 7,168 T1's and equivalent to 256 DS-3's. Data is transmitted synchronously using an established optical synchronous data communication network referred to as SONET. While transition to optical fiber communication lines is progressing, the conventional PSTN remains primarily dominated by copper lines.

Utilizing the conventional architecture illustrated in FIG. 1, a user at a EUU 18 connects an internet appliance 20 (for example a computer, a personal digital assistant PDA, an MP3 audio player, a digital camera, video camera, etc.) with the ISP or BSP 10 over the PSTN utilizing a conventional computer modem 22. Data is transferred asynchronously or synchronously between the ISP 10 and the EUU 18. The data transmission capability of the network architecture to provide service to the EUU 18 is primarily limited by the bandwidth capability of the twisted wire pair coupling the EUU 18 to the SCO 16. This bandwidth limitation between the SCO 16 and the EUU 18, which represents the bottleneck of the overall network, is sometimes referred to as the "last mile" problem.

Figure 2:
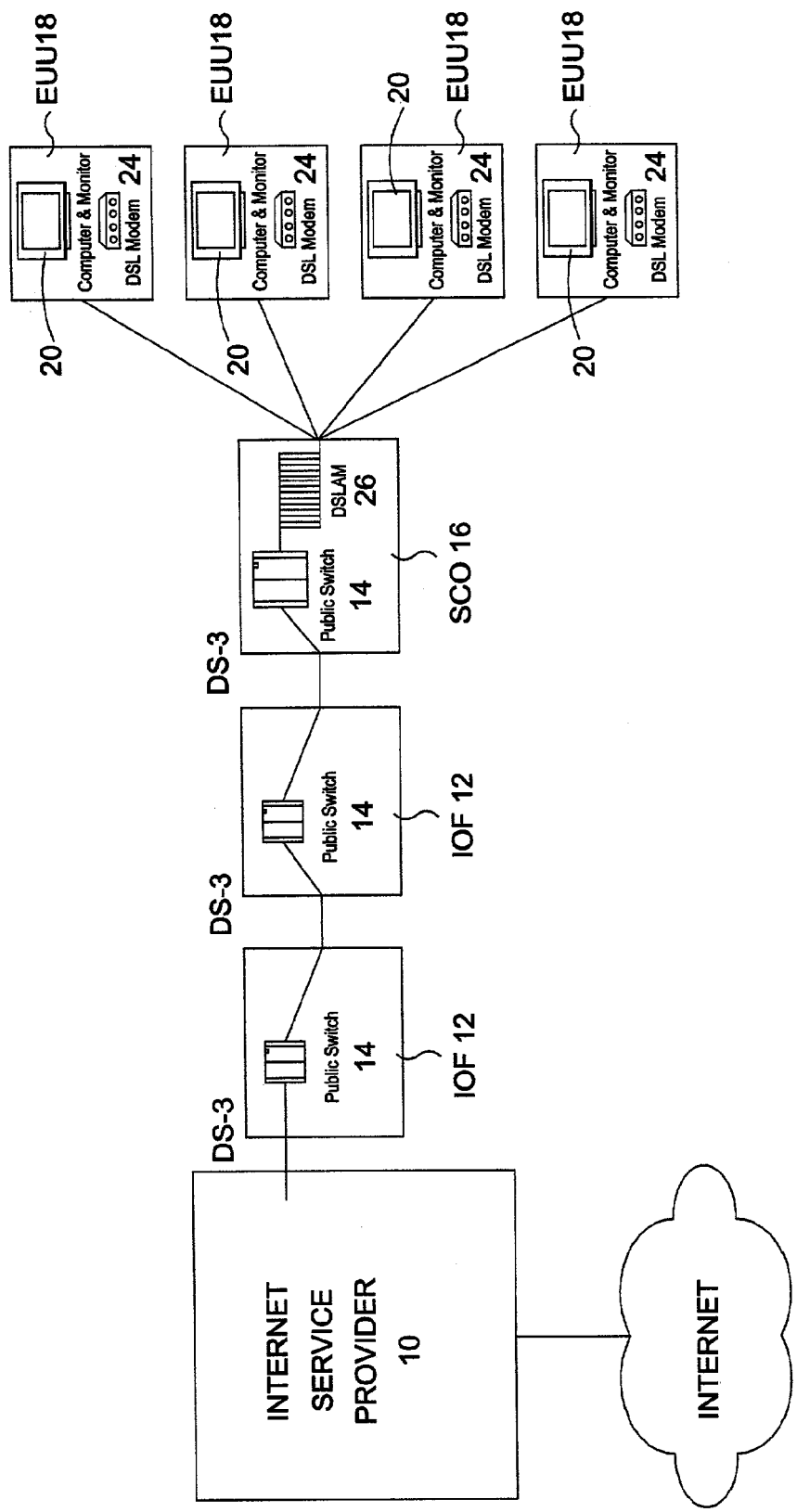
FIG. 2 is a block diagram of a conventional public switched network utilizing DSL technology.

DSL technology was developed, in part, to address the so-called "last mile" problem in order to overcome the bandwidth restrictions of the architecture illustrated in FIG. 1. DSL technology utilizes advanced digital signal processing to enhance data transmission rates through a conventional copper twisted pair line. In order to implement DSL technology, the conventional modem 22 is replaced with a DSL modem 24 as shown in FIG. 2. The DSL modem 24 includes the necessary signal processing circuitry to implement a standardized DSL protocol. In addition, the SCO 16 is provided with a Digital Subscriber Line Access Multiplexer (DSLAM) 26, which enables the SCO 16 to communicate with a plurality of DSL modems 24 provided in a plurality of EUU's 18. The DSLAM 26 separates data received from the EUU's 18 into conventional telephone voice data and multimedia data (everything other than conventional telephone voice data including audio, text, graphic, video, etc.). The conventional telephone voice data is routed through the public switch 14 of the CO 18 and through the IOF's 12 of the PSTN and handled as a telephone call in a conventional manner. The multimedia data is routed through one or more DS-1 or DS-3 lines or OC lines specifically designated for that purpose.

The conventional DSL architecture illustrated in FIG. 2, while certainly an improvement, still suffers from a number of deficiencies. For example, although the bandwidth provided to the EUU's 18 is improved, the overall bandwidth or capacity of the PSTN is not increased. In other words, although the DSL architecture separates the conventional telephone voice data from the multimedia data, nothing is done to enhance the underlying capability of the conventional copper and optical fiber architecture to handle greater capacity. Accordingly, implementation of the DSL architecture ultimately results in a reduction in the number of conventional voice lines that are available, as some of the available bandwidth is dedicated for use in transmitting the multimedia data.

Still further, the architecture illustrated in FIG. 2 requires the use of several different transmission protocols. Data transmission between the DSL modem 24 and the internet appliance 20 is accomplished over a Local Area Network (LAN) using an established protocol such as Ethernet. Data transfer between the DSL modem 24 and the DSLAM 26 is accomplished through the use of an established DSL protocol. The DSLAM 26 must then convert from the DSL protocol to the asynchronous protocol used by the PSTN, namely, ATM. Still further, if optical fiber is utilized within the PSTN, a protocol conversion between ATM and SONET is required. Accordingly, the network requires a number of protocol layers that can lead to complexity and latency in the network due to the requirements of converting from one protocol to another.

The present invention is based, in part, on the recognition that a new system for the simultaneous, bi-directional transmission of video bandwidth signals developed for LAN's could be utilized to solve the "final mile" problem associated with conventional network architectures described above. For example, U.S. Pat. No. 5,537,142 issued to Fenouil and entitled "Local Area Network for Simultaneous Bi-Directional Transmission of Video Bandwidth Signals, Including a Switching Matrix Which Defines User Connections, Upstream Connections, and Downstream Connections", the contents of which are incorporated herein by reference, and U.S. Pat. No. 6,240,554 issued to Fenouil entitled "Local Area Network for Simultaneous, Bi-Directional Transmission of Video Bandwidth Signals", the contents of which are incorporated herein by reference, describe a new technology that allows for simultaneous, bi-directional transmission of video bandwidth signals and an economical switching network for implementation of the technology to local area networks. By the application of the technology described in these patents (hereinafter referred to as Broadband Subscriber Line (BSL) technology) to the problems associated with conventional public switched networks, the present inventor realized that is was possible to overcome the deficiencies associated with DSL technology. Specifically, a public switched broadband network can be obtained that utilized existing copper and optical fiber infrastructure to provide simultaneous, bi-directional broadband transmission between an ISP or BSP and an EUU coupled to the network through at least a single copper twisted pair line.

Figure 3:
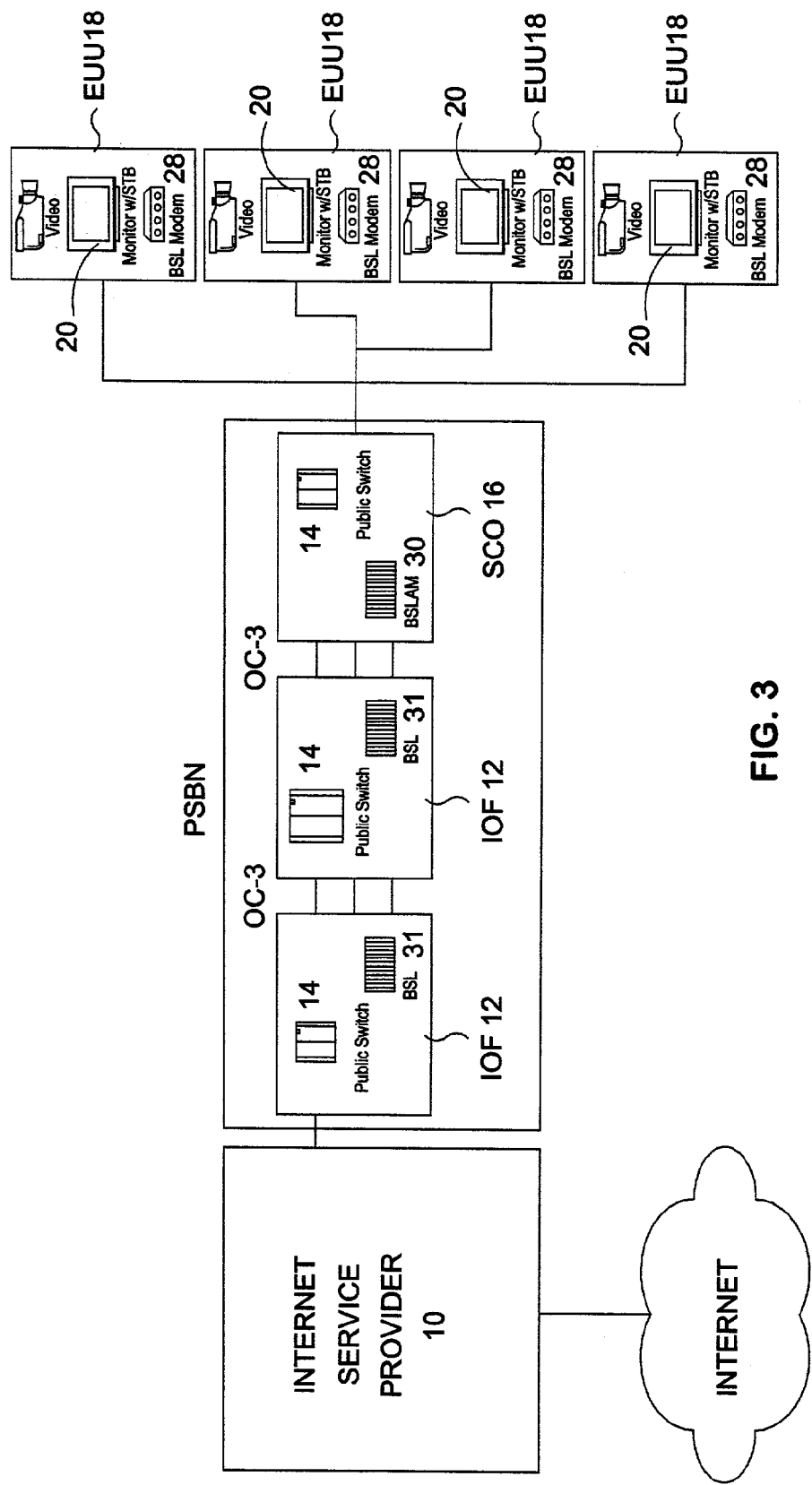
FIG. 3 is a block diagram of a public switched broadband network in accordance with a first embodiment of the invention.

Referring now to FIG. 3, a first embodiment of a system in accordance with the present invention is shown in which the EUU's 18 are provided with BSL modems 28. The BSL modems 28 communicate with the internet appliances 20 using a LAN protocol such as Ethernet. In the illustrated embodiment, the DSLAM 26 is replaced by a BSL access multiplexer 30 provided at the SCO 16. The BSL switches 30 communicate with the BSL modems 28 using the same Ethernet protocol. Accordingly, data is transmitted from the SCO 16 to the computers 20 of the EUU's 18 using a common asynchronous data transmission protocol.

The BSL switch 30 separates the conventional telephone voice data from the multimedia data in a manner similar to that of a POTS splitter within certain models of the DSLAM 26, wherein the conventional voice data is supplied to the public switch 14 and handled in a conventional manner. In the illustrated preferred embodiment, the IOF's 12 and the SCO 16 are linked by optical fiber communication lines, wherein one of the optical communication lines is designated to handle the multimedia. Preferably, no conventional optical protocol is required on the optical fiber communication line designated to handle non-voice data, but instead, data is transmitted over the optical fiber communication line utilizing the same common asynchronous data transmission protocol (for example Gigabyte Ethernet) utilized to communicated from the SCO 16 to the internet appliance 20. Accordingly, a single protocol can be utilized to transmit multimedia data all the way from the ISP 10 to the internet appliance 20 provided at the EUU 18 without requiring a protocol conversion, thereby greatly simplifying the network and eliminating latency problems.

Figure 4:
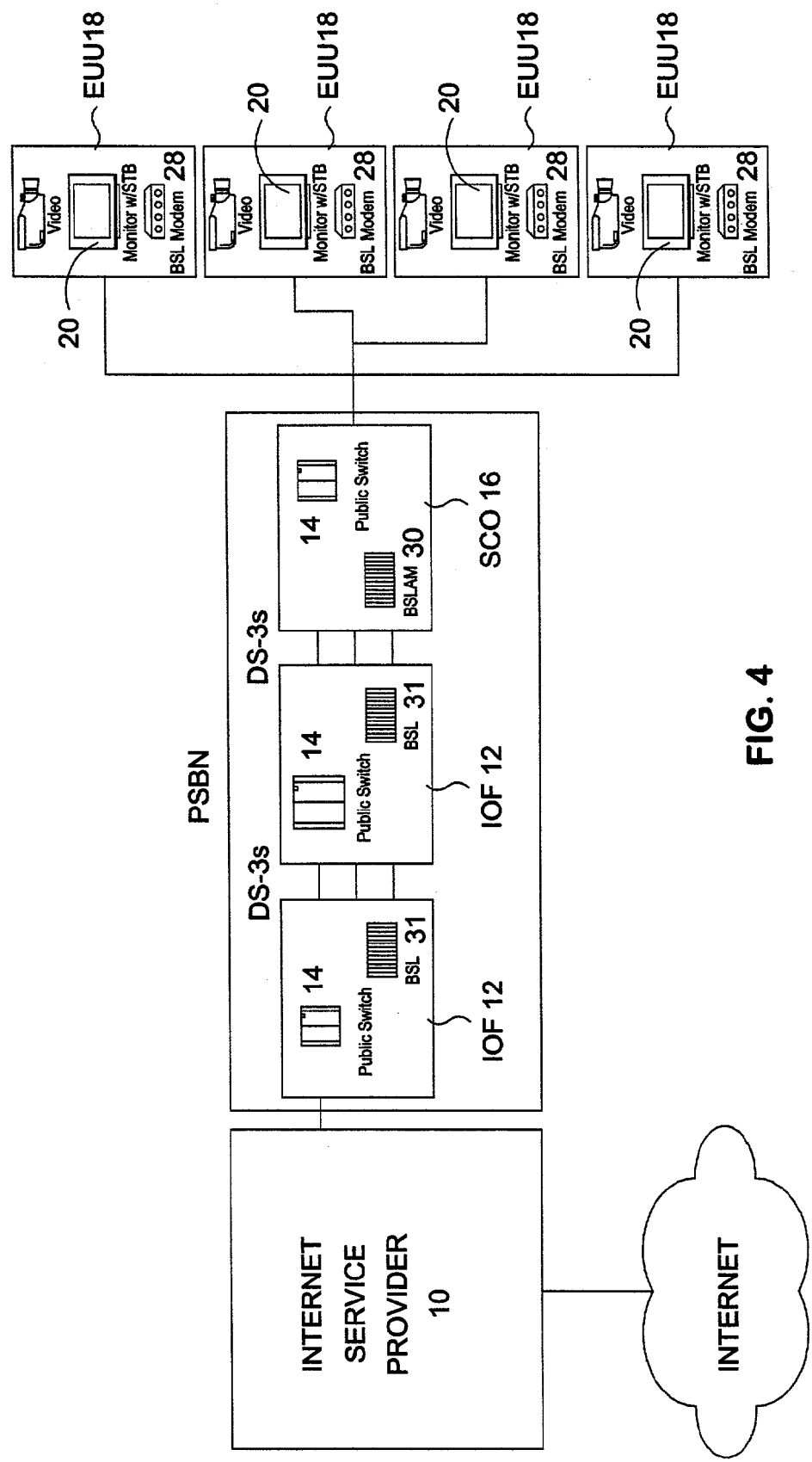
FIG. 4 is a block diagram of a public switched broadband network in accordance with a second embodiment of the invention.

In an alternative embodiment illustrated in FIG. 4, where only copper DS-3 lines are still employed, one or more copper lines can be designated for transmitting the multimedia data. In such a case, each IOF 12 is provided with BSL 31 transport or cross-connect switches thereby enabling a much higher bandwidth to be achieved than possible through copper by conventional means. Accordingly, the second embodiment has the advantage of being capable of implementation in the oldest PSTN without requiring upgrading to optical fiber transmission lines, yet still enabling broadband capacity to be delivered to the EUU 18.

The above-described PSBN will enable an unlimited number of commercial applications to be easily implemented. For example, multi-point integrated production services can now be fully realized to produce a variety of products including music and video productions from multiple locations. Real-time online collaboration, including broadcast quality video conferencing, will now be economically feasible, along with multi-point, multi-player real-time video gaming. Perhaps most importantly, PSBN will allow the internet and other internet related services to fully compete with cable based systems to offer interactive television, interactive media options to subscribers homes, as well as conventional high-speed broadband internet access.

The invention has been described with reference to certain preferred embodiments thereof. It will be understood that modifications and variations are possible within the scope of the appended claims. For example, the invention is not limited to a specific data transmission protocol. Although the preferred embodiments utilize Ethernet, other protocols may be readily employed. Further, it will be understood that the term "internet appliance" is any device intended to transmit and/or receive multimedia data from the PSBN. Further, while the term "multimedia data" is not intended to include conventional telephone voice traffic, it does include audio data associated with applications such as videoconferencing. Further, while the present preferred embodiments utilize BSL technology between the SCO and the EUU, and technology that would permit the use of a common data transmission protocol between the SCO and the internet appliance provided at the EUU may be employed. Still further, while the illustrated embodiments show the use of a BSL modem separate from the internet appliance, it will be understood by those skilled in the art that the BSL modem (i.e. the data communication device) may be incorporated within the internet appliance.

What is claimed is:

1. A data transmission system comprising:
   at least one serving central office, wherein the serving central office includes a switching device;
   at least one end user unit, wherein said end user unit includes: a) a data communication device coupled to the switching device of the serving central office via a twisted pair line: and b) an internet appliance device that is coupled to the data communication device;
   wherein multimedia data is transferred between the switching device of the serving central office and the data communication device of the end user unit, and between The data communication device of the end user unit and the internet appliance device of the end user unit using a common data transmission protocol; and
   wherein the switching device includes a Broadband Subscriber Line (BSL) switching device and the data communication device includes a Broadband Subscriber Line (BSL) data communication device.

2. A data transmission system as claimed in claim 1, further comprising at least one interoffice facility coupled to the serving central office via a first data transmission line, wherein the multimedia data is transferred between the interoffice facility and the serving central office over the first data transmission line using the common data transmission protocol.

3. A data transmission system as claimed in claim 2, further comprising at least one broadband service provider or internet service provider coupled to the interoffice facility via a second data transmission line, wherein the multimedia data is transferred between the broadband service provider or internet service provider and the inter office facility over the second data transmission line using the common data transmission protocol.

4. A data transmission system as claimed in claim 3, wherein at least one of the first transmission line and the second transmission line comprise an optical fiber transmission line.

5. A data transmission system as claimed in claim 4, wherein at least one of the first transmission line and the second transmission line comprises a copper transmission line.

6. A data transmission system as claimed in claim 1, further comprising at least one interoffice facility coupled to the serving central office via a first data transmission line and at least one internet service provider coupled to the interoffice facility via a second data transmission line, wherein at least one of the first data transmission line and the second data transmission line comprise an optical fiber transmission line, and wherein the multimedia data is transmitted over the optical fiber transmission line utilizing an optical data transmission protocol that is different from the common data transmission protocol.

7. A data transmission system as claimed in claim 1, wherein the common data transmission protocol is an asynchronous protocol.

8. A data transmission system as claimed comprising:
   at least one serving central office, wherein the serving central office includes a switching device;

at least one end user unit, wherein said end user unit includes: a) a data communication device coupled to the switching device of the serving central office via a twisted pair line; and b) an internet appliance device that is coupled to the data communication device;

wherein multimedia data is transferred between the switching device of the serving central office and the data communication device of the end user unit, and between the data communication device of the end user unit and the internet appliance device of the end user unit using a common data transmission protocol; and wherein the data transmission rate between the serving central office and the end user unit is at least 10 Mbps symmetrically.

9. A data transmission system comprising:

at least one serving central office, wherein the serving central office includes a switching device;

at least one end user unit, wherein said end user unit includes: a) a data communication device coupled to the switching device of the serving central office via a twisted pair line; and b) an internet appliance device that is coupled to the data communication device;

wherein multimedia data is transferred between the switching device of the serving central office and the data communication device of the end user unit, and between the data communication device of the end user unit and the internet appliance device of the end user unit using a common data transmission protocol; and wherein the maximum transmission distance from the central serving office to the end user unit is at least 8500 ft.

10. A system comprising:

a public switched telephone network including a serving central office;

at least one end user unit coupled to the serving central office via a twisted pair line; and data transfer means for transferring multimedia data between the serving central office of the public switched telephone network to the end user unit using a common data communication protocol consisting of a single protocol layer.

11. A system as claimed in claim 10, wherein the end user unit includes an internet appliance device, wherein the data transfer means includes a switching device located in the serving central office and a data communication device located in the end user unit, and wherein the data communication device is coupled to the internet appliance and transfers the multimedia data between the internet appliance and the switching device using the common data transmission protocol.

12. A system as claimed in claim 10, wherein the public switched telephone network includes at least one inter office facility coupled to the serving central office via a communication line, and wherein the multimedia data is transferred between the interoffice facility and the serving central office using the common data transmission protocol.

13. A system as claimed in claim 12, further comprising at least one internet service provider coupled to the interoffice facility via a further communication line, and wherein the multimedia data is transferred between the internet service provider and the interoffice facility using the common data transmission protocol.

14. A system as claimed in claim 13, wherein at least one of the communication line and the further communication line comprise an optical fiber communication line.

15. An apparatus as claimed in claim 13, wherein at least one of the communication line and the further communication line comprise a copper communication line.

16. An system as claimed in claim 10, wherein the data transmission protocol is an asynchronous data transmission protocol.

17. A method of transferring data comprising:

generating data using an internet appliance at an end user unit;

transferring the data from the internet appliance to a data communication device of the end user unit using a common data transmission protocol consisting of a single protocol layer; and transferring the multimedia data from the data communication device of the end user unit to a serving central office of a public switched telephone network via a twisted pair line using the common data transmission protocol.

18. A method as claimed in claim 17, further comprising transferring the multimedia data from the serving central office to an inter office facility over a communication line using the common data transmission protocol.

19. A method as claimed in claim 18, further comprising transferring the multimedia data from the interoffice facility over a further communication line to at least one internet service provider.

* * * * *